United States Patent [19]
Cornec et al.

[11] Patent Number: 6,064,584
[45] Date of Patent: May 16, 2000

[54] INVERTER POWER SUPPLY DEVICE WITH CONTROLLED OUTPUT POWER

[75] Inventors: René Cornec, St Mesmin; Didier Gouardo, Saran; Christophe Yve, St Jean de la Ruelle, all of France

[73] Assignee: Brandt Cooking, St Jean de la Ruelle, France

[21] Appl. No.: 09/387,789

[22] Filed: Sep. 1, 1999

[30] Foreign Application Priority Data

Sep. 11, 1998 [FR] France .................................. 98 11352

[51] Int. Cl.[7] .................................................. H02M 3/24
[52] U.S. Cl. ................................ 363/95; 363/16; 363/17; 363/98
[58] Field of Search ........................... 363/16, 17, 41, 363/95, 98, 131, 132; 219/625

[56] References Cited

U.S. PATENT DOCUMENTS

| | | | |
|---|---|---|---|
| 5,283,412 | 2/1994 | Gouardo et al. | 219/627 |
| 5,324,917 | 6/1994 | Boyer et al. | 219/497 |
| 5,539,630 | 7/1996 | Pietkiewicz et al. | 363/17 |
| 5,622,643 | 4/1997 | Morizot et al. | 219/625 |

FOREIGN PATENT DOCUMENTS 2 701 612 A1   8/1994   France .

*Primary Examiner*—Jessica Han
*Attorney, Agent, or Firm*—Oblon, Spivak, McClelland, Maier & Neustadt, P.C.

[57] ABSTRACT

An inverter power supply device designed to supply power to a resonant circuit, includes a generator, having at least one switch series-connected with the resonant circuit and a freewheeling diode parallel-connected with the switch, the switch being controlled by a periodic signal with a frequency known as a working frequency. The device furthermore includes first device providing a measurement of the instantaneous current flowing in the resonant circuit; second device to deduce the maximum current ($I_{max}$) from the instantaneous current; third device to deduce the current known as the switching current from the instantaneous current, this switching current being the current for which the switch or the freewheeling diode that is associated with it becomes conductive ($I_{commut}$); first control device for the switch, receiving the maximum current($I_{max}$), the switching current ($I_{commut}$) and an instructed value given by the user, modifying the instructed value given by the user as a function of the maximum current ($I_{max}$) and the switching current ($I_{commut}$) and giving the periodic signal as a function of the modified instructed value.

18 Claims, 4 Drawing Sheets

INVERTER POWER SUPPLY DEVICE WITH CONTROLLED OUTPUT POWER

BACKGROUND OF THE INVENTION

1. Field of the Invention

The invention pertains to an inverter-based power supply device designed to supply power to a load with variable impedance. The invention can be used especially in the field of induction heating in domestic cooking. Indeed, the shape and the material of the kitchen utensils that can be heated by induction are giving rise to major changes in the load that is powered by the power generator.

2. Description of the Prior Art

Many devices, such as for example the one described in the patent application EP 0 405 611, set up an automatic control over the power delivered by a generator, so that it may be a function solely of an instructed value given by the user, independently of the material and shape of the utensil. To achieve this goal, the electronic components of such structures must be oversized, and this increases the cost of making such devices. Furthermore, certain kitchen utensils may have particular impedance values that can endanger the generator, for example by destroying certain electronic components. To overcome this danger, certain generators, such as for example the one described in the patent application EP 0 561 207, use a safety system that stops the generator if the current, in certain electronic components, exceeds an acceptable maximum value. This type of safety system totally rules out the use of certain utensils which nevertheless could be used by limiting the current delivered by the generator.

The invention seeks to control the power delivered by the generator. At the same times it seeks to enable the generator to deliver the maximum power without endangering it and approach, as far as possible, the instructed value of power given by a user.

SUMMARY OF THE INVENTION

To achieve this goal, an object of the invention is an inverter power supply device designed to supply power to a resonant circuit, comprising a generator, comprising at least one switch series-connected with the resonant circuit and a freewheeling diode parallel-connected with the switch, the switch being controlled by a periodic signal with a frequency known as a working frequency, the device furthermore comprising:

first means providing a measurement of the instantaneous current flowing in the resonant circuit, second means to deduce the maximum current from the instantaneous current, third means to deduce the current known as the switching current from the instantaneous current, this switching current being the current for which the switch or the freewheeling diode that is associated with it becomes conductive, first control means for the switch, receiving the maximum current, the switching current and an instructed value given by the user, modifying the instructed value given by the user as a function of the maximum current and the switching current and giving the periodic signal as a function of the modified instructed value.

BRIEF DESCRIPTION OF THE DRAWINGS

The invention will be understood more clearly and other advantages shall appear from the description of various embodiments illustrated by the appended drawing, of which.

MORE DETAILED DESCRIPTION

For greater clarity, in the various figures, the same topological references refer to the same elements.

Figure 1:
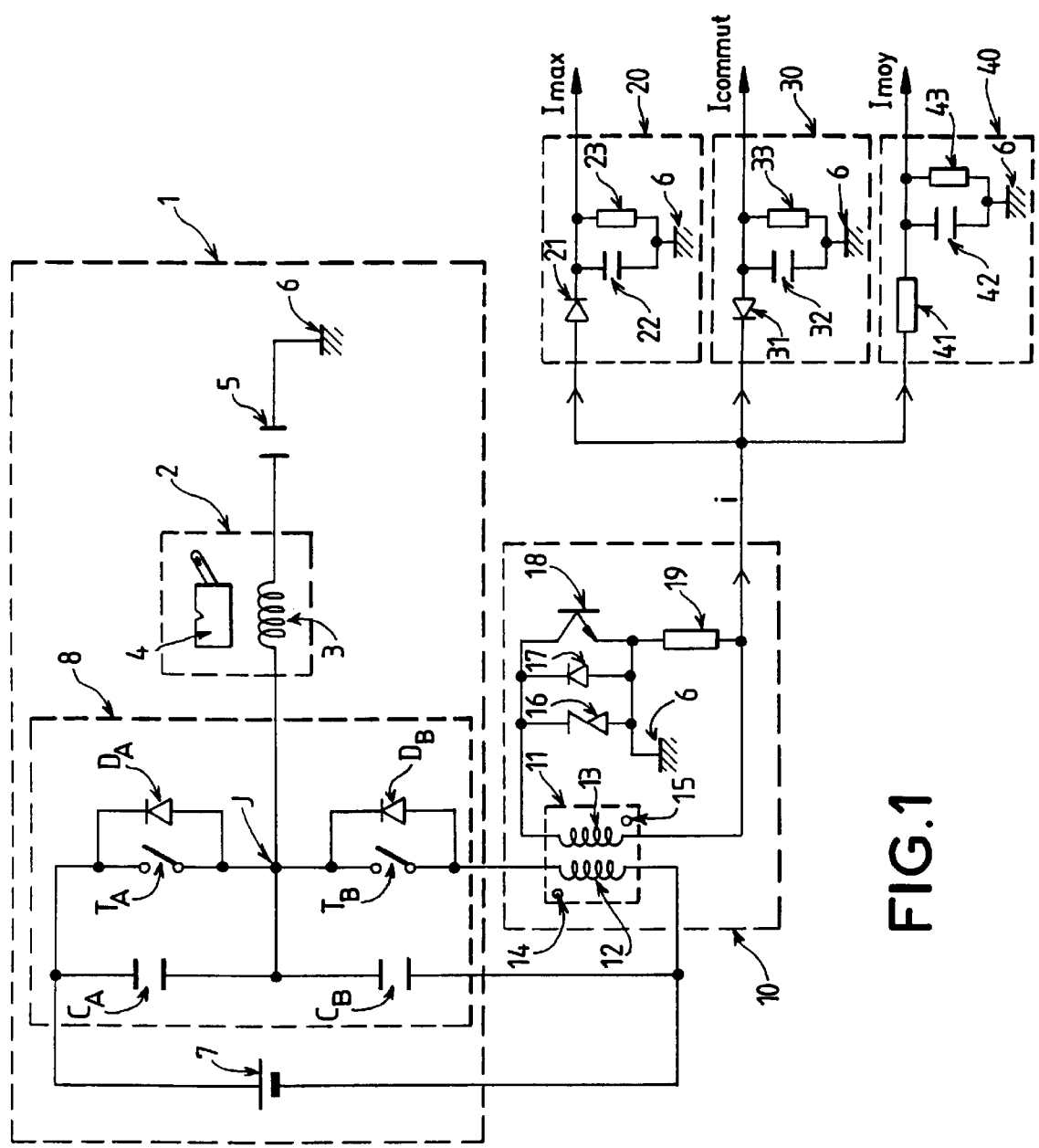
FIG. 1 shows a generator powering a resonant circuit as well as a measurement of current according to the invention.

FIG. 1 has a box 1 containing a conventional inverter power generator structure 8 supplying power to a mainly inductive load 2. In the field of domestic cooking, this load comprises an inductor 3, generally placed beneath a glass-ceramic plate, and a cooking utensil 4 placed on the glass-ceramic plate. There are many parameters that can cause variations in the impedance of the load 2. These are mainly the shape, the material of the utensil 4 and its position with respect to the inductor 3. To a smaller extent, it is also noted that when the temperature of the inductor 3 and utensil 4 changes, the impedance of the load 2 changes. Since the goal of the invention is to achieve optimal control of the power delivered by the inductor 3, it is clear that the invention is not limited to the field of domestic cooking and can be used whenever it is sought to deliver a given value of power to a load that is liable to variation. A capacitor 5 is connected between one of the terminals of the load 2 and a ground 6. The load 2 and the capacitor 5 form a resonant circuit. The other terminal of the load 2 is connected to the junction point J of two switches $T_A$ and $T_B$. These two switches $T_A$ and $T_B$ are advantageously electronic switches such as thyristors of bipolar transistors, field-effect transistors or voltage-controlled transistor type switches known as IGBTs (Insulated Gate Bipolar Transistors). The control means for these two switches are not shown. Advantageously, these means primarily control the frequency at which the switches $T_A$ and $T_B$ open and close. An exemplary embodiment of control means such as these is described in the application for a certificate of addition to the patent No. FR 2 578 697. The switch $T_A$ terminal that is not connected to the point J is connected to the positive pole of a d.c. voltage source 7. The switch $T_A$ terminal that is not connected to the point J is connected to the negative pole of the d.c. voltage source 7. Advantageously, the d.c. voltage source 7 is made by rectifying an AC mains voltage equal, for example, to 230V. The means for making the d.c. voltage source 7 are not shown in FIG. 1. Moreover, in the box 1, there are two diodes $D_A$ and $D_B$ called freewheeling diodes. The cathode of the diode $D_A$ is connected to the positive pole of the d.c. voltage source 7. The anode of the diode $D_A$ and the cathode of the diode $D_B$ are connected to the junction point J of the two switches $T_A$ and $T_B$. The anode of diode $D_B$ is connected to the negative pole of the d.c. voltage source 7. Moreover, the box 1 advantageously includes two capacitors $C_A$ and $C_B$ for assistance with the switching of the switches $T_A$ and $T_B$. The capacitor $C_A$ is connected between the positive pole of the d.c. voltage source 7 and the junction point J. The capacitor $C_B$ is connected between the junction point J and the negative pole of the d.c. voltage source 7. The two switches $T_A$ and $T_B$, the two freewheeling diodes $D_A$ and $D_B$ and the two switching-assistance capacitors $C_A$ and $C_B$ form an inverter power generator 8.

Figure 2:
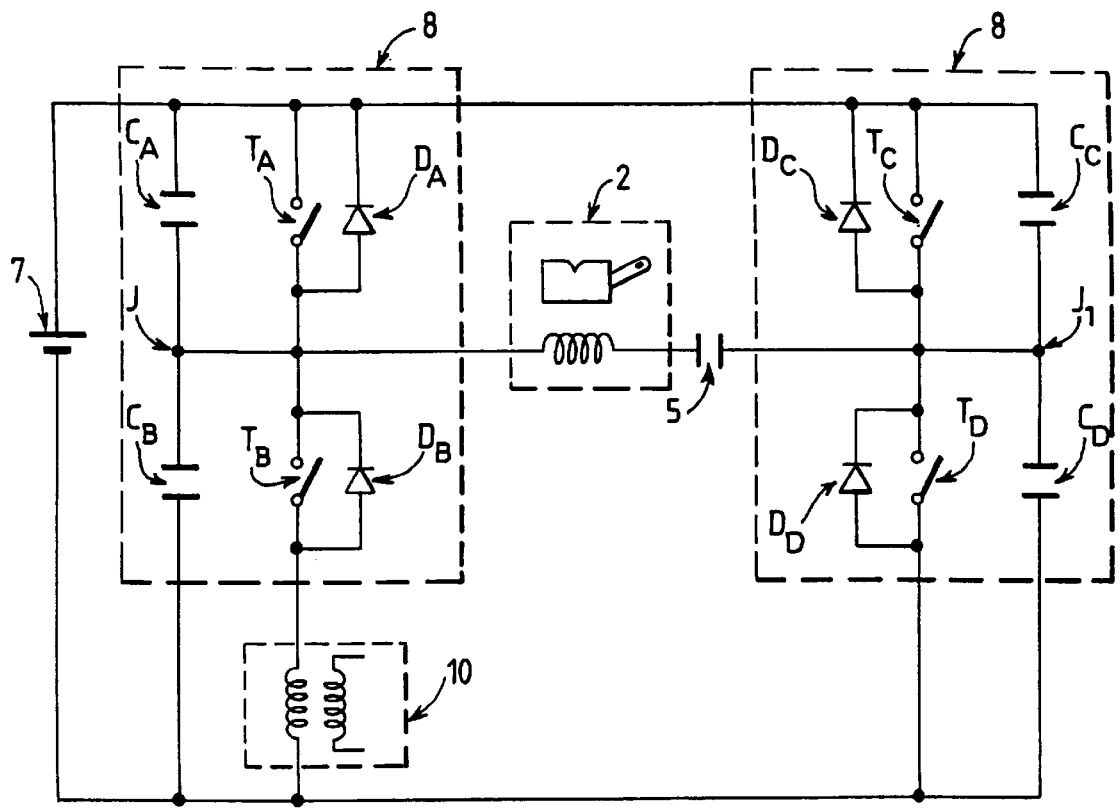
FIG. 2 shows the use of the invention in a generator structure known as a full-bridge structure.

The structure of the generator 8 shown in the box 1 is a structure known as a half-bridge structure. It is clearly understood that the invention can be implemented for other structures of generator such as for example a full-bridge structure shown in FIG. 2. As a complement to the half-bridge structure shown in FIG. 1, this structure comprises two additional switches $T_C$ and $T_D$ having a junction point J1 connected to the capacitor 5 instead of the ground 6 shown in FIG. 1. These two additional switches $T_C$ and $T_D$ are, like the switches $T_A$ and $T_B$, connected to the d.c. voltage source 7. As in the case of the assembly shown in FIG. 1, a diode, $D_C$, $D_D$ respectively and a capacitor, $C_C$, $C_D$ respectively are parallel-connected with each switch $T_C$, $T_D$. All these diodes $D_A$, $D_B$, $D_C$, $D_D$, capacitors $C_A$, $C_B$, $C_C$, $C_D$ and switches $T_A$, $T_B$, $T_C$, $T_D$ form a generator that works in a manner that is equivalent to the generator 8 shown in FIG. 1. For greater convenience, the generator shown in FIG. 2 also bears the reference 8. The resonant circuit, comprising the load 2 and capacitor 5, is connected between the junction points J and J1.

Figure 3:
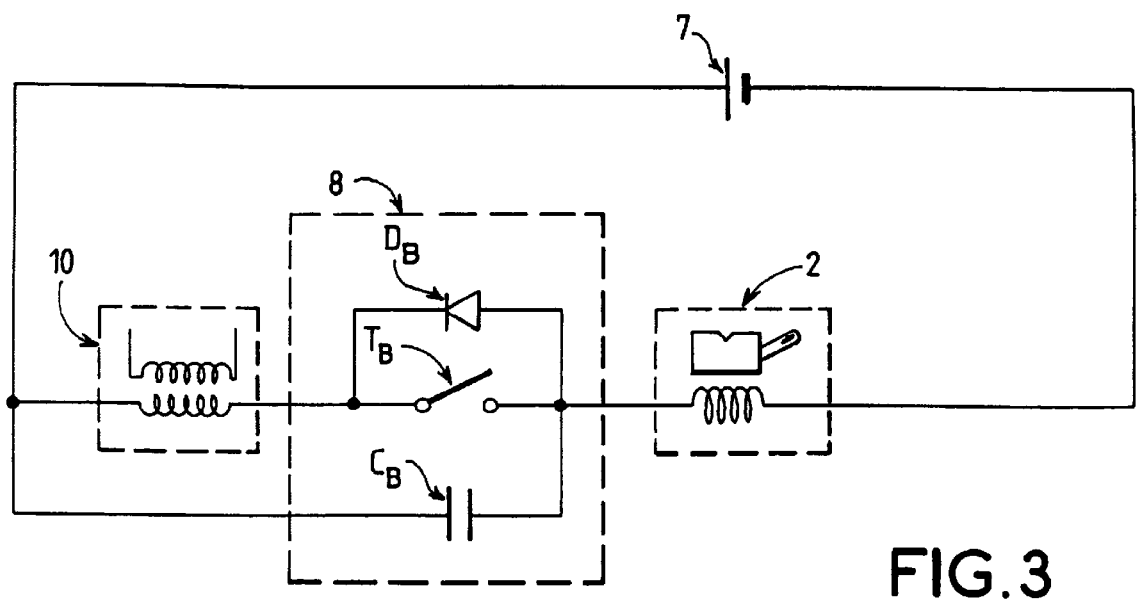
FIG. 3 shows the use of the invention in a generator structure known as the mono-switch structure.

The invention can equally well be implemented in a structure comprising only one switch, known as a mono-switch structure. A structure of this kind is shown in FIG. 3. In this figure, the generator 8 comprises only one switch $T_B$ to which there are parallel-connected a freewheeling diode $D_B$ and a resonance and switching assistance capacitor $C_B$. On the diode $D_B$ cathode side, the switch $T_B$, the capacitor $C_B$ and the diode $D_B$ are connected to the positive pole of the d.c. voltage source 7. On the diode $D_B$ anode side, the switch $T_B$, the capacitor $C_B$ and the diode $D_B$ are all three connected to the negative terminal of the d.c. voltage source 7 by means of the resonant circuit which, in the mono-switch structure, comprises only the load 2. The resonance capacitor function is performed by the capacitor $C_B$.

In accordance with the invention, the device comprises means 10 to measure the instantaneous current flowing in the resonant circuit 2, 5. Advantageously, these means, shown in the box 10 in FIGS. 1, 2 and 3, measure the instantaneous current flowing in the switch $T_B$ and in the freewheeling diode $D_B$. For the embodiments shown in FIGS. 1 and 2, the means 10 are connected between, firstly, the common point of the switch $T_B$ and the anode of the diode $D_B$ and, secondly, the negative pole of the d.c. power supply 7. For the embodiment shown in FIG. 3, the means 10 are connected between, firstly, the common point of the switch $T_B$ and the cathode of the freewheeling diode $D_B$ and, secondly, the positive pole of the d.c. voltage source 7. The capacitor $C_B$, for its part, is directly connected to the positive pole of the d.c. voltage source 7 without going through the means 10. In practice, the switch $T_B$ and the freewheeling diode $D_B$ are not conductive simultaneously. Hereinafter in the description, no distinction shall be made between the current flowing in the switch $T_B$ and in the diode $D_B$. Indeed, this distinction is of no value for the invention.

For the generator structures comprising several switches, it is of course possible to consider replacing the measurement of current in the switch $T_B$ and the diode $D_B$ by a measurement of current in another switch and its associated freewheeling diode. In a full-bridge structure, all that will be done is to measure the current in one of the four switches and its associated freewheeling diode.

One advantage related to the invention is that the current measurement means 10 may be unique means whatever the structure of the generator 8. Indeed, when the generator has several switches, they function in a substantially identical way, with a time lag between one another. Consequently, knowledge of the current flowing in only one of the switches and in the freewheeling diode associated with it is sufficient to know the current flowing in the other switches and their associated freewheeling diode.

Figure 4:
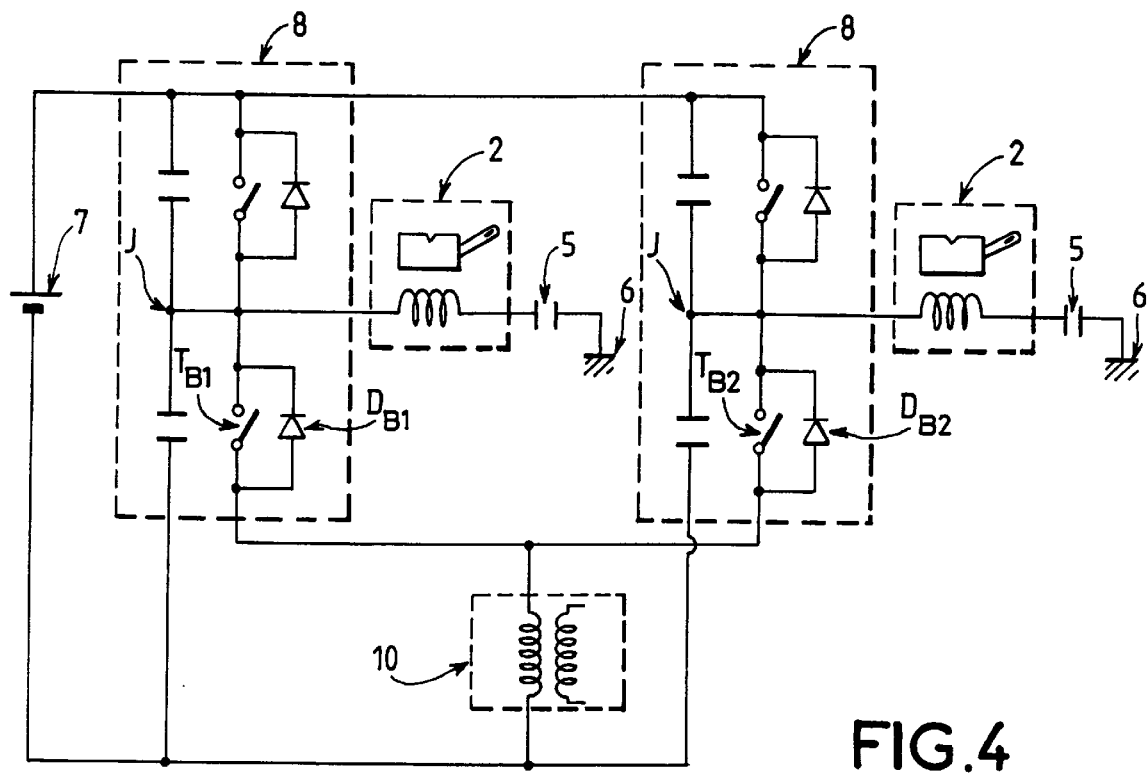
FIG. 4 shows the use of the invention for two generators parallel-supplied between the terminals of one and the same d.c. power supply.

It is even possible to consider using unique current measurement means 10 for several generators 8 supplied with power in parallel between the terminals of one and the same d.c. power supply 7, provided that these various generators 8 work not simultaneously but in alternation. Alternating operation is often envisaged to avoid magnetic couplings between inductors close to one another. FIG. 4 illustrates an assembly in which two generators 8 are connected in parallel between the terminals of one and the same d.c. power supply 7. Each of the generators 8 powers a resonant circuit, comprising a load 2 and a capacitor 5. Each resonant circuit is connected between the junction point J of each generator 8 and the ground 6. Unique means 10 are designed to measure the instantaneous current flowing either in the switch $T_{B1}$ and in the freewheeling diode $D_{B1}$ of the first generator 8 or in the switch $T_{B2}$ and in the freewheeling diode $D_{B2}$ of the second generator 8. The means 10, in FIG. 4, are connected between, firstly, the common point of the switches $T_{B1}$ and $T_{B2}$ and the diodes $D_{B1}$ and $D_{B2}$ and, secondly, the negative pole of the d.c. power supply 7. It is clearly understood that the invention is not limited to two generators 8.

An exemplary embodiment of the means 10 is described in greater detail by means of FIG. 1. The means 10 advantageously comprise a current transformer 11 whose primary winding 12 is connected between the terminal of the switch $T_B$ not connected to the junction point J and the negative pole of the d.c. voltage source 7. In FIG. 1, the capacitor $C_B$ is directly connected to the negative pole of the d.c. voltage source 7. It is also possible to connect the capacitor $C_B$ to the d.c. voltage source 7 by means of the primary winding 12. Indeed, even if the current measured by the current transformer 11 measures the current in the capacitor $C_B$ in addition to the current in the switch $T_B$ and the diode $D_B$, this does not raise any difficulties for the implementation of the invention, since the mean current in the capacitor $C_B$ is zero and since, in the operation of the generator, the capacitors $C_A$ and $C_B$ are conductive for only a small proportion of the time. This alternative embodiment of connection of the capacitor $C_B$ can, of course, be implemented whatever the structure of the generator 8.

The current transformer 11 comprises a secondary winding 13. A first end of the winding 13, is connected to the cathode of a Zener diode 16, the cathode of a diode 17 and the collector of an NPN bipolar transistor 18. The anodes of the Zener diode 16 and the diode 17 and the transmitter of the transistor 18 are connected to the ground 6. A resistor 19 is connected between the ground 6 and the second end of the winding 13. The output of the means 10 is located on the terminal of the resistor 19 connected to the winding 13. A signal representing the instantaneous current i is present at the output of the means 10. FIG. 1 does not show the control of the transistor 18 which is achieved by its base. It is obtained in such a way that the transistor 18 is on when the switch $T_B$ or the freewheeling diode is conductive. The current transformer 11 is biased in such a way that when a current flows from the switch $T_B$ towards the negative pole of the d.c. voltage source 7, through the primary winding 12 of the current transformer 11, another current is generated in the secondary winding 13 of the transformer 11 in the connection between the winding 13 and the resistor 19, towards the resistor 19. The biasing of the windings 12 and 13 is represented by points 14 and 15 placed in the vicinity of one of the ends of each winding 12 and 13.

When a current flows in the diode DB, the transistor 18 is conductive and a negative voltage appears at the terminals of the resistor 19. When a current flows in the switch TB towards the negative pole of the d.c. voltage source 7, through the winding 12, a current flows in the diode 17 and a positive voltage appears at the terminals of the resistor 19. When the switch TB opens, no current flows in the primary winding 12 but the secondary winding 13 tends to get demagnetized. Since the transistor 18 is not on, a reverse voltage is created at the terminals of the Zener diode 16, making it conductive from its cathode to its anode. The demagnetization of the secondary winding 13 is chiefly absorbed by the increase in voltage at the terminals of the Zener diode 16, in generating only a weak current in this diode and consequently only a low voltage at the terminals of the resistor 19. The voltage measured at the terminals of the resistor 19 can therefore be likened to a measurement of the instantaneous current i crossing the switch TB and the diode DB. This voltage forms the signal representing the instantaneous current i.

Another exemplary embodiment of the means 10 is made by connecting a low-value resistor known as a <<shunt>> instead of the primary winding 12. A voltage is measured at the terminals of this low-value resistor. This voltage represents a signal representing the instantaneous current i. This exemplary embodiment has the drawback of giving rise to Joule's heat losses greater than the losses entailed by the exemplary embodiment shown in FIG. 1.

The box 20 exemplifies means to deduce the maximum current $I_{max}$ flowing in the switch TB and diode DB from the instantaneous current i. The means 20 comprise a diode 21, a capacitor 22 and a resistor 23. The anode of the diode 21 is connected to the output of the means 10. The cathode of the diode 21 is connected to the first terminal of the capacitor 22 and the first terminal of the resistor 23. The second terminal of the capacitor 22 and the second terminal of the resistor 23 are both connected to the ground 6. The signal available at output of the means 10, which represents the instantaneous current i flowing in the switch TB and the diode DB, crosses the diode 21 when it is conductive and positively charges the capacitor 22. At the cathode of the diode 21, there is thus a signal representing the maximum current $I_{max}$ flowing in the switch TB and diode DB. The resistor 23 has the function of discharging the capacitor 22 to enable a new measurement of the maximum current $I_{max}$. The value of the resistor 23 is chosen so that, with the capacitor 22, it presents a time constant compatible with the need for repeated measurements of the maximum current $I_{max}$ at each period of closure of the switch TB.

The box 30 shows an exemplary means for deducing the current known as the switching current from the instantaneous current i. This switching current is the current for which the switch TB or the freewheeling diode DB associated with it becomes conductive $I_{commut}$. The means 30 comprise a diode 31, a capacitor 32 and a resistor 33. The cathode of the diode 31 is connected to the output of the means 10. The anode of the diode 31 is connected to the first terminal of the capacitor 32 and the first terminal of the resistor 33. The second terminal of the capacitor 32 and of the resistor 33 are both connected to the ground 6. The signal available at output of the means 10, which represents the instantaneous current i flowing in the switch TB and diode DB, crosses the diode 31 when it is conductive and negatively charges the capacitor 32. At the anode of the diode 31, there is thus a signal representing the switching current $I_{commut}$. The function of the resistor 33 is to discharge the capacitor 32 to enable a new measurement of the switching current $I_{commut}$. The value of the resistor 33 is selected so that, with the capacitor 32 it has a time constant compatible with the need for repeated measurements of the switching current $I_{commut}$ during each period of closure of the switch TB.

The box 40 exemplifies means to deduce the mean current $I_{moy}$ flowing in the switch TB and diode DB from the instantaneous current i. The means 40 comprise an integrator which can be made with a first resistor 41, a capacitor 42 and a second resistor 43. The first terminal of the resistor 41 is connected to the output of the means 10. The second terminal of the resistor 41 is connected to the first terminal of the capacitor 42 and the first terminal of the resistor 43. The second terminal of the capacitor 42 and the second terminal of the resistor 43 are both connected to the ground 6. The signal available at output of the means 10, which represents the instantaneous current i flowing in the switch TB and the diode DB, crosses the resistor 41 and charges the capacitor 42. The values of the resistor 41 and of the capacitor 42 are selected so that they have a time constant sufficient to integrate the signal available at output of the means 10 during the time when the switch TB or the freewheeling diode are conductive. At the second terminal of the resistor 41, there is thus a signal representing the mean current $I_{moy}$ flowing in the switch TB and the diode DB. The value of the resistor 43 is selected so that, with the capacitor 42, it presents another time constant enabling the capacitor 42 to get discharged sufficiently to allow a measurement of the mean current $I_{moy}$ at each period of closure of the switch TB.

Figure 5:
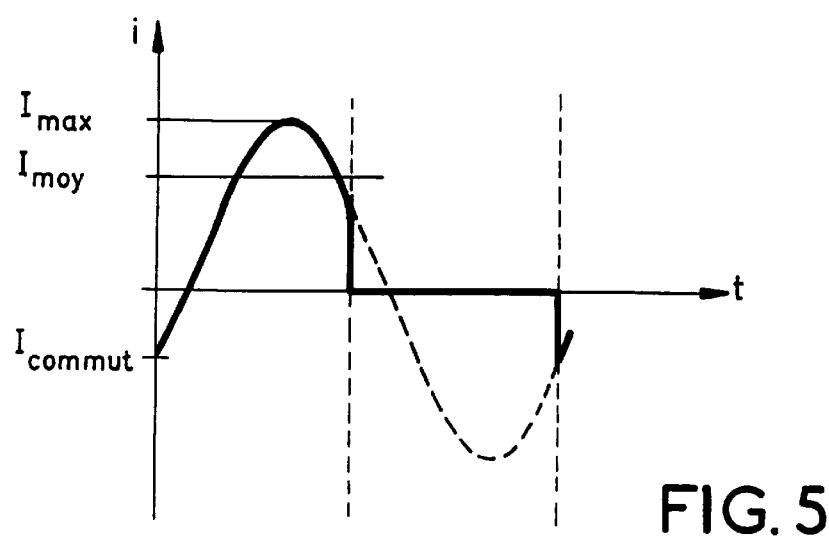
FIG. 5 is a curve exemplifying the progress of the instantaneous current in time, this current flowing in one of the switches and in the freewheeling diode associated with this switch.

FIG. 5 shows a curve in a Cartesian system of references. The instantaneous current i, flowing in the switch TB and in the diode DB of a half-bridge generator structure, is represented on the y-axis. Time is represented on the x-axis. The curve is represented for a period of time whose reverse is the frequency at which the switches TA and TB open and close. The switch TB and the diode DB conduct current only during the first half of the period and the instantaneous current i is represented by a bold line. During the second half of the period, the instantaneous current i is zero and the bold-line curve runs along the time axis. For the second half of the period, there is also a dashed curve representing the current flowing in the switch TA and in the diode DA, which the means 10 do not measure. The starting point of the bold-line curve is on the y-axis at a negative value of $I_{commut}$ of the instantaneous current i. This value is measured by the means 30. Then, when time passes, the bold-line curve increases up to a value $I_{max}$ of the current i. This value $I_{max}$ is measured by the means 20. The bold-line curve continues decreasing to a value close to $-I_{commut}$ when the switch TB and the diode DB stop conducting at the end of the first half-period of time to allow the switch TA and the diode DA to be conductive in their turn. FIG. 5 also shows the value $I_{moy}$ of the current i. $I_{moy}$ is the mean value of the current i during the first half-period. The value $I_{moy}$ is measured by the means 40.

Figure 6:
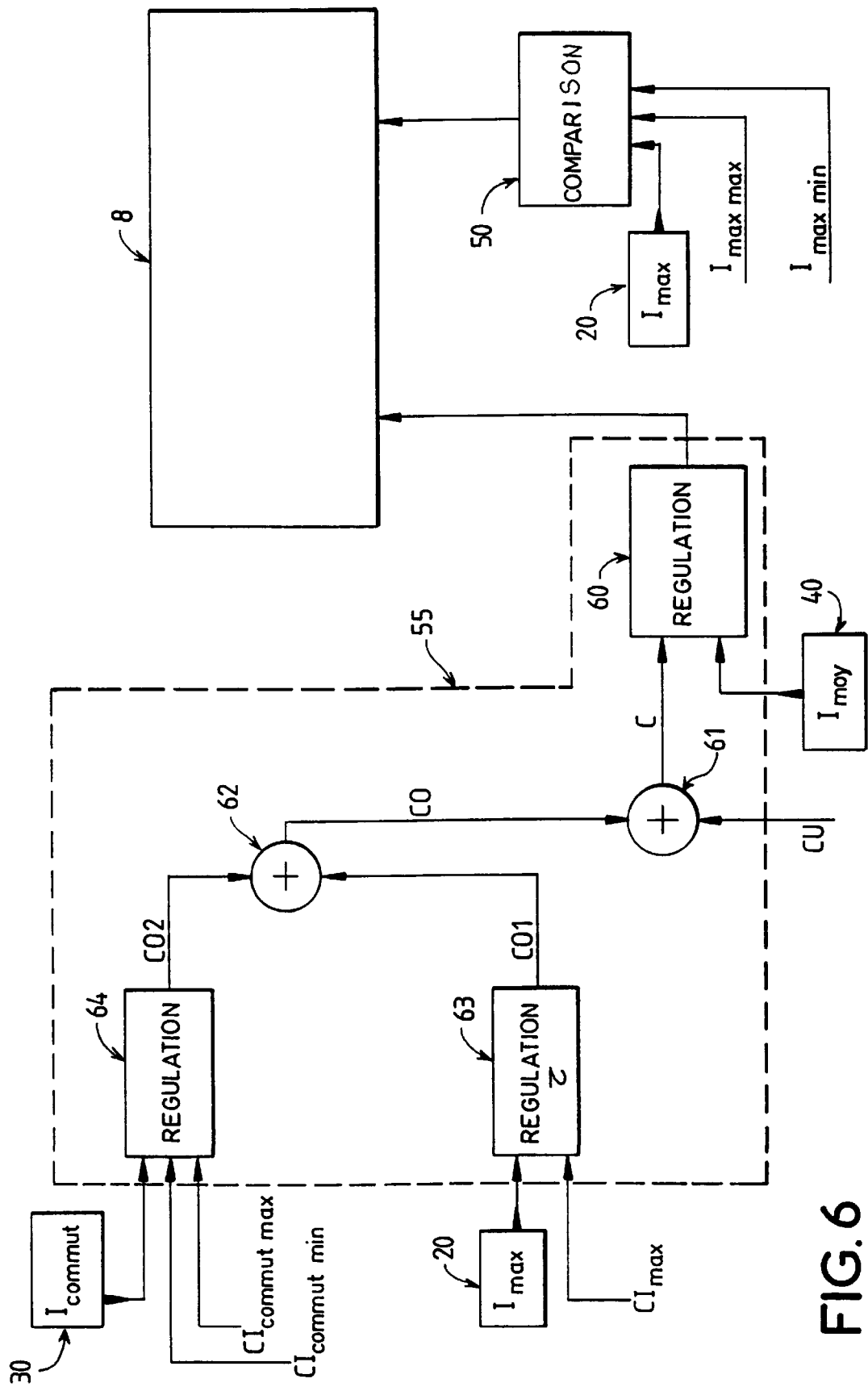
FIG. 6 shows the use of the maximum current, the instantaneous current and the mean current to control the generator.

FIG. 6 is used to describe an example of means to control the generator 8 of FIG. 1. In order to ensure the safety of the components of the generator 8, a comparison module 50 comprises an output generating a signal that enables the operation of the generator 8 to be stopped, for example by opening the two switches TA and TB simultaneously. The comparison module 50 comprises three inputs. The maximum current $I_{max}$ is present at the first input of the comparison module 50. Two reference points $I_{max\ max}$ and $I_{max\ min}$ are each present at the other two inputs of the comparison module 50. The comparison module 50 compares the maximum current $I_{max}$ with the two reference points $I_{max\ max}$ and $I_{max\ min}$ and as long as the value of the maximum current $I_{max}$ lies between the values of the two reference points $I_{max\ max}$ and $I_{max\ min}$, the signal generated at the output of the comparison module 50 permits the operation of the generator 8. On the other hand, if the value of the maximum current $I_{max}$ becomes lower than the reference point $I_{max\ min}$ or higher than the reference point $I_{max\ max}$, then the signal generated at the output of the comparison module 50 quickly stops the operation of the generator 8.

The reference point $I_{max\ max}$ is determined so that the current in the switch TB and the diode DB remains lower than a value that could damage the switch TB or the diode DB. It is clear, as we have seen from FIG. 5, that the operation of the switches TA and TB as well as that of the diodes DA and DB is appreciably similar. Consequently, the limitation provided by the comparison module 50 protects both the switches TA and TB and the diodes DA and DB. It would be the same for a full-bridge structure for which all the switches and diodes are protected.

The value of the reference point $I_{max\ min}$ is determined so that a minimum power is transmitted by the inductor 3 to the utensil 4. Indeed, it has been noted that certain utensils having poor magnetic qualities poorly absorb the power delivered by the inductor. This results in a maximum weak current $I_{max}$. Thus, for a given user's instructed value, the power absorbed by a utensil 4 having poor magnetic qualities will be lower than it is for a utensil 4 having better magnetic qualities. Consequently, when excessively low power is absorbed by the utensil, it is necessary to stop the generator 8.

The load 2 and the capacitor 5 shown in FIG. 1 form a resonant circuit having a resonance frequency. To modulate the power absorbed by the load 2, action is advantageously taken on the frequency of a periodic signal that controls the opening and the closing of the switches TA and TB. This frequency is called a working frequency. It is chosen, for example, that the working frequency should always be higher than the resonance frequency of the resonant circuit. Thus, the power absorbed in the load is the maximum when the working frequency is close to the resonance frequency and, in order to reduce the absorbed power, the working frequency is increased. A control strategy such as this is described, for example, in the French patent application 96 01059 filed on behalf of the Applicant. It is of course possible to consider a working frequency lower than the resonance frequency but, to simplify the rest of description, it will be assumed that the working frequency remains higher than the resonance frequency.

According to the invention, the device comprises control means shown in the box 55. These means 55 control the switches TA and TB in receiving the maximum current $I_{max}$, the switching current $I_{commut}$ and an instructed value given by the user CU. The control means 55 modify the instructed value given by the user CU as a function of the maximum current $I_{max}$ and of the switching current $I_{commut}$ and give the periodic signal as a function of the modified instructed value C. The periodic signal controls the switches TA and TB of the generator 8 at the working frequency. The control means 55 comprise three regulation modules 60, 63 and 64 as well as two adders 61 and 62. The periodic signal is given by the regulation module 60 which comprises two inputs. The mean current $I_{moy}$ is present at its first input. An instructed value C is present at its second input. The regulation module 60 prepares the periodic signal so that the mean current $I_{moy}$ is appreciably equal to the instructed value C. An example of the preparation of the periodic signal is described in the French patent application 96 01059 filed on behalf of the present Applicant. Should the selected working frequency be higher than the resonance frequency and when the mean current $I_{moy}$, is greater than the instructed value C, the regulation module 60 increases the working frequency until the mean current $I_{moy}$ becomes appreciably equal to the instructed value C. Conversely, when the mean current $I_{moy}$ is lower than the instructed value C, the regulation module 60 decreases the working frequency until the mean current $I_{moy}$ becomes appreciably equal to the instructed value C. The regulation module 60 servo-controls the mean current $I_{moy}$. This amounts to setting up a servo-control over the power delivered by the generator 8. Indeed, it is possible to compute the power by multiplying the value of the mean current $I_{moy}$ by the value of the voltage of the d.c. voltage source 7.

The instructed value C is a signal prepared by modifying an instructed value given by the user CU by means of the adder 61 comprising two inputs. The first input of the adder 61 is connected to a data input means not shown in FIG. 4 and enabling the user to indicate his instructed value CU to the device. The input means comprise for example a keyboard.

The second input of the adder 61 is connected to the second adder 62 delivering a correction signal CO. The adder 62 adds up the signals present at its two inputs.

A signal CO1, present at the first input of the adder 62, is delivered by the regulation module 63 comprising two inputs. The maximum current $I_{max}$ is present at the first input of the regulation module 63. A reference point $Cl_{max}$ is delivered to the second input of the regulation module 63. The regulation module 63 compares the maximum current $I_{max}$ with the reference point $Cl_{max}$ and, so long as the value of the maximum current $I_{max}$ is lower than the reference point $Cl_{max}$ no correction CO1 is applied to the user's instructed value CU through the adders 62 and 61. If, on the other hand, the value of the maximum current $I_{max}$ becomes higher than the reference point $Cl_{max}$, the regulation module 63 generates a negative signal CO1 which, through the adders 62 and 61, tends to reduce the value of the instructed value C with a certain time constant τ. The regulation module 63 may for example comprise a PID (proportional plus integral plus derivative) type regulation or control whose parameters P, I and D will be adapted to define the time constant.

The reference point $Cl_{max}$ is given so that the current in the switch TB and diode DB remains lower than a value of current that could damage the switch TB or the diode DB. This reference point $Cl_{max}$ is chosen to be slightly lower than the reference point $I_{max\ max}$ which enables the generator 8 to be stopped quickly. The reference point $Cl_{max}$ is appreciably the maximum value of current that a switch and its associated freewheeling diode can take in steady-state operation. If the value of $I_{max}$ exceeds the reference point $Cl_{max}$, the regulation module 63 tends to lower the value $I_{max}$ with the time constant τ. If nevertheless the value of $I_{max}$ increases too quickly, to the point where it reaches the reference point $I_{max\ max}$, then it is the comparison module 50 that stops the generator 8. It can now be specified that the reference point $I_{max\ max}$ is determined by the current that a switch and its associated freewheeling diode can accept without deterioration during the period of time τ.

A signal CO2 present at the second input of the adder 62 is delivered by the regulation module 64 comprising three inputs. The switching current $I_{commut}$ is present at the first input of the regulation module 64. A reference point $Cl_{Commut\ max}$ is delivered at the second input of the regulation module 64. Another reference point $Cl_{Commut\ min}$ is delivered at the third input of the regulation module 64. The switching current $I_{commut}$ is negative in a normal operation of the generator 8, as shown in FIG. 5. Nevertheless, hereinafter, we shall consider the absolute values of the switching current $I_{commut}$ and of the reference points $Cl_{Commut\ min}$ and $Cl_{Commut\ max}$. The regulation module 64 compares the switching current $I_{commut}$ with the reference points $Cl_{Commut\ min}$ and $Cl_{Commut\ min}$, and so long as the value of the switching current $I_{commut}$ remains included between the values of the reference points $Cl_{Commut\ min}$ and $Cl_{Commut\ max}$, no correction CO2 is applied to the instructed value given by the user CU through the adders 62 and 61. If, on the other hand, the value of the switching current $I_{commut}$ becomes higher than the value of the reference point $Cl_{Commut\ max}$, then the regulation module 64 generates a negative signal CO2 which, through the adders 62 and 61, tends to reduce the value of the instructed value C. Moreover, if the value of the switching current $I_{commut}$ becomes lower than the value of the reference pint $Cl_{Commut\ min}$, the regulation module 64 generates a positive signal CO2 which, through the adders 62 and 61, tends to increase the value of the instructed value C.

The value of the reference point $Cl_{Commut\ max}$ is greater than the value of the reference point $Cl_{Commut\ min}$. The value of the reference point $Cl_{Commut\ max}$ is given so that a switch and its associated freewheeling diode are not damaged by an excessively great switching current which would cause them to get heated. The value of the reference point $Cl_{Commut\ min}$ is determined so that the switching assistance capacitors CA and CB can get sufficiently charged. Indeed if these capacitors CA and CB do not get sufficiently charged, the switches TA and TB are not closed. This problem is explained in greater detail in the French patent application 96 01059 filed on behalf of the present Applicant.

What is claimed is:

1. An inverter power supply device designed to supply power to a resonant circuit, comprising a generator, comprising at least one switch series-connected with the resonant circuit and a freewheeling diode parallel-connected with the switch, the switch being controlled by a periodic signal with a frequency known as a working frequency, wherein the device furthermore comprises:
    first means providing a measurement of the instantaneous current flowing in the resonant circuit,
    second means to deduce the maximum current ($I_{max}$) from the instantaneous current,
    third means to deduce the current known as the switching current from the instantaneous current, this switching current being the current for which the switch or the freewheeling diode that is associated with it becomes conductive ($I_{commut}$)
    first control means for the switch, receiving the maximum current($I_{max}$), the switching current ($I_{commut}$) and an instructed value given by the user, modifying the instructed value given by the user as a function of the maximum current ($I_{max}$) and the switching current ($I_{commut}$) and giving the periodic signal as a function of the modified instructed value.

2. A device according to claim 1, wherein the instantaneous current is measured in the switch and in the freewheeling diode associated with this switch.

3. A device according claim 1, comprising several generators functioning alternately, wherein the first means are common to the various generators.

4. A device according to claim 1, furthermore comprising second control means for the switch, quickly stopping the operation of the generator when the maximum current does not lie between two first reference points ($I_{max\ max}$, $I_{max\ min}$) relating to the maximum current ($I_{max}$).

5. A device according to claim 4, wherein the highest ($I_{max\ max}$) of the first two reference points ($I_{max\ max}$, $I_{max\ min}$) is determined so that the instantaneous current (i) remains lower than a value that could damage the switch or the freewheeling diode.

6. A device according to claim 4, wherein the lowest ($I_{max\ min}$) of the first two reference points ($I_{max\ max}$, $I_{max\ min}$) is determined so that a minimum value of power is transmitted by the generator to the resonant circuit.

7. A device according to claim 1, wherein the third means comprise a second diode negatively charging a second capacitor, the voltage at the terminals of the second capacitor forming a signal representing the switching current ($I_{commut}$).

8. A device according to claim 1, wherein the modified instructed value is obtained by reducing the instructed value given by the user when the value of the maximum current ($I_{max}$) exceeds a third reference point ($Cl_{max}$) relating to the maximum current ($I_{max}$).

9. A device according to claim 8, wherein the third reference point ($Cl_{max}$) is slightly lower than highest ($I_{max\ max}$) of the first two reference points ($I_{max\ max}$, $I_{max\ min}$).

10. A device according to claim 1, wherein the modified instructed value is furthermore obtained by reducing the instructed value given by the user when the value of the switching current ($I_{commut}$) exceeds a high reference point ($Cl_{commut\ max}$) relating to the switching current ($I_{commut}$).

11. A device according to claim 10, wherein the high reference point ($Cl_{commut\ max}$) relating to the switching current ($I_{commut}$) is determined so that the switch and associated freewheeling diode are not damaged by an excessively strong switching current.

12. A device according to claim 1, wherein the modified instructed value is furthermore obtained by increasing the instructed value given by the user when the value of the switching current ($I_{commut}$), becomes lower than a low reference point ($Cl_{commut\ min}$) relating to the switching current ($I_{commut}$).

13. A device according to claim 12, wherein the generator comprises a switching assistance capacitor parallel-connected with the switch, and wherein the low reference point ($I_{commut\ min}$) relating to the switching current ($I_{commut}$) is determined so that the switching assistance capacitor can get sufficiently charged.

14. A device according to claim 1, wherein the first means comprise a current transformer, electronic components cause a current to flow in a resistor when the switch or the freewheeling diode associated with this switch are conductive and the voltage at the terminals of the resistor forms a signal representing the instantaneous current flowing in the switch and the freewheeling diode associated with this switch.

15. A device according to claim 1, wherein the second means comprise a first diode positively charging a first capacitor, the voltage at the terminals of the first capacitor forming a signal ($I_{max}$)representing the maximum current flowing in the switch and in the freewheeling diode associated with this switch.

16. A device according to claim 1, furthermore comprising fourth means to deduce the mean current ($I_{moy}$) from the instantaneous current, wherein the first control means comprise a regulation module receiving the mean current ($I_{moy}$) and the modified instructed value and providing the periodic signal.

17. A device according to claim 16, wherein the regulation module controls the working frequency.

18. A device according to claim 16, wherein the fourth means comprise an integrator.

* * * * *